Feb. 27, 1968     R. W. HOLL     3,370,612
FOUR-WAY BALL VALVE
Filed Oct. 19, 1964
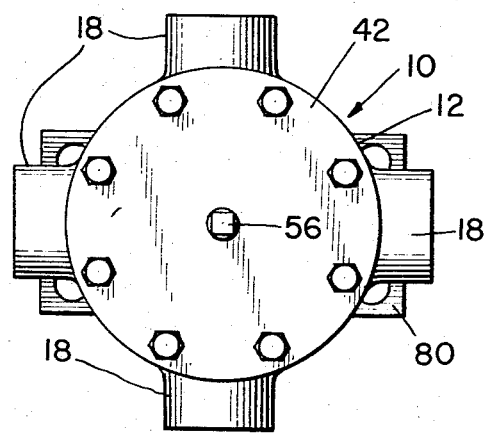
*Fig. 1.*
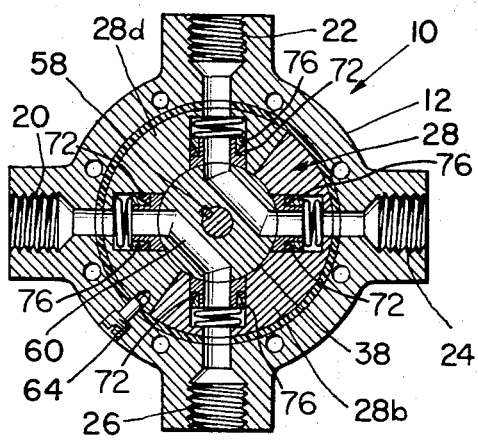
*Fig. 3.*
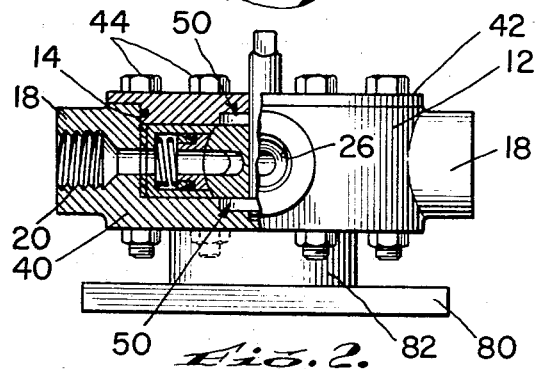
*Fig. 2.*
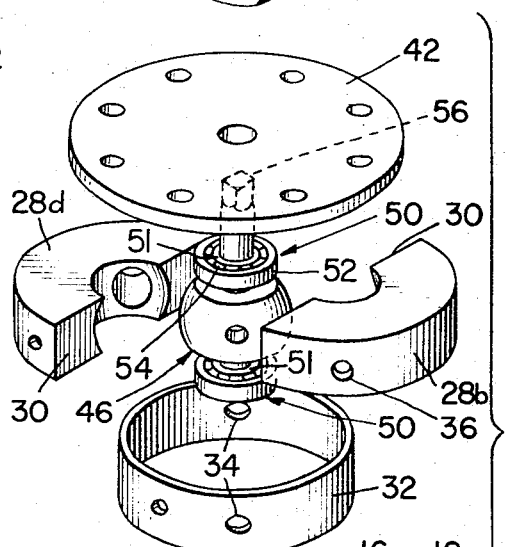
*Fig. 4.*
*Fig. 5.*
*Fig. 6.*
INVENTOR.
ROBERT W. HOLL
BY
ATTORNEY

United States Patent Office 3,370,612
Patented Feb. 27, 1968

3,370,612
FOUR-WAY BALL VALVE
Robert W. Holl, Pasadena, Calif.
(1709–B Cedar St., Alhambra, Calif. 91801)
Filed Oct. 19, 1964, Ser. No. 404,616
9 Claims. (Cl. 137—625.47)

This invention relates generally to fluid flow control devices and more particularly to improvements in flow control valves.

Generally speaking, flow control valves of the type to which this invention pertains comprise a body with at least two ports and a valve core movable in the body between a first position, wherein the ports communicate through a fluid passage in the core, and a second position wherein the core blocks the ports. In the event the valve body has but two ports and the core has but a single passage, movement of the valve core is effective to merely regulate or entirely block fluid flow from one valve port to the other. Some valves of this class, on the other hand, are equipped with more than two ports in the valve body and with one or more fluid passages in the valve core, which ports and passages are arranged in such manner as to permit selective communication and blocking of the ports by movement of the core to different positions. A four-way rotary valve, for example, is a valve of this type.

One of the major problems encountered in valves of the kind under discussion involves sealing of the valve against leakage. Valves of this type, for example, are prone to leak fluid between the valve body and core. One way of reducing this valve leakage is to employ resilient seals. The seals in the existing valves, however, are prone to wear rapidly and, moreover, are not adapted for use in rotary valves. Another way to reduce valve leakage, and the only practical way to reduce leakage in a rotary valve is to precision machine the valve in such manner that the core has an extremely close fit in the valve body. Such a precision valve, however, is difficult and costly to construct. In addition, the valve is capable of operation only over a very narrow temperature range. The reason, of course, is that the thermal expansion and contraction of the valve ports which occurs when the valve is exposed to excessive temperature range results either in leakage between the core and valve body or binding of the core in the body. Accordingly, most existing valves either permit an excessive amount of leakage, particularly when the valves are exposed to widely varying temperatures, or the valves are limited to very narrow temperature range applications.

Another deficiency of the existing valves resides in the fact that they are ill suited to high pressure applications. That is to say, most existing valves, particularly rotary valves, when installed in a high pressure fluid system, permit an excessive amount of fluid leakage. Further, the construction of many existing valves is such that the fluid pressure forces active on the valve core are unbalanced. As a result, the force required to move the valve core is relatively high, particularly when the valves are closed or installed in high pressure fluid systems.

Some prior art valves, of course, have been designed to alleviate the problems discussed above. Most, if not all, of these latter valves, however, are relatively complex in construction, costly to manufacture, and difficult to assemble. Moreover, most of the existing valves of this type require extremely close tolerances between their sealing surfaces, with the result that the valves are extremely sensitive to wear; that is, any wear whatsoever at the sealing surfaces tends to induce fluid leakage. Excessive pressure drop is a further disadvantage of many valves. It is evident, therefore, that there is a definite need for an improved valve of the class described.

It is a general object of this invention to provide such an improved valve.

A highly important object of the invention is to provide an improved valve of the character described which is uniquely constructed for use in high pressure fluid systems as well as for operation over a wide temperature range.

Yet another object of the invention is to provide an improved valve which is relatively insensitive to wear at the sealing surfaces.

A further object of the invention is to provide an improved valve which is relatively simple to assemble.

Yet a further object of the inventon is to provide an improved rotary valve.

A still further object of the invention is to provide an improved valve which is relatively simple in construction, economical to manufacture, requires less precision machining than the existing precision rotary valves, creates a minimum pressure drop, and is otherwise ideally suited for its intended purposes.

With the foregoing objects in view, together with such additional objects and advantages as may subsequently appear, the invention resides in the parts, and in the construction, combination, and arrangement of parts, described, by way of example, in the following specification of a presently preferred embodiment of the invention, reference being had to the accompanying drawings which form a part of said specification, and in which drawings:

FIG. 1 is a top plan view of the valve;

FIG. 2 is a side elevation of the valve, partially sectioned to expose the interior structure of the valve;

FIG. 3 is a transverse section through the valve in slightly enlarged scale;

FIG. 4 is an exploded perspective view of the valve;

FIG. 5 is an enlarged fragmentary section taken through one of the fluid ports of the valve; and FIG. 6 is an exploded perspective view of certain of the fluid sealing elements shown in FIG. 5.

The valve 10 illustrated in these drawings comprises a cylindrical body 12 having a shallow cylindrical recess 14 extending part way therethrough. Extending axially through the annular wall of the valve body are a plurality of generally uniformly spaced bores 16 to receive bolts, as dscribed below. Valve body 12 has four external, uniformly spaced coupling sleeves 18 for connection to external piping (not shown). Coupling sleeves 18 may be internally threaded, if desired, for connection to the external piping. Extending axially through the coupling sleeves into the body bore 12 are ports or passages 20, 22, 24 and 26, respectively. The inner ends of these passages are shown as being reduced in diameter.

Within the recess 14 in the valve body 12 is a bearing ring insert 28 including a pair of mating, complementary semi-circular ring sections 28a, 28b. The end faces 30 of these sections abut one another to form a complete ring. Bearing insert 28 is surrounded by a seal ring 32 which retains the ring sections 28a, 28b in assembled relation during installation in the recess 14 and provides a seal between the valve body and the bearing insert after assembly. To this end, the bearing insert 28 and its seal ring 32 are proportioned to have a snug fit in the recess 14, such that the seal ring is compressed between the wall of the bore and the insert. The seal ring 32 may be made of various materials but is preferably constructed of Teflon to facilitate insertion and removal of the bearing insert 28 into and from the recess 14.

As shown best in FIG. 4, the seal ring 32 has ports 34 aligned with the ports 20, 22, 24 and 26 in the valve body. The bearing ring insert 28 is disposed with its end faces 30 in a plane inclined at about a 45° angle to the axes of the body ports and has passages 36 aligned with the body passages respectively. The inner ends of the ring passages 36 are counterbored, as shown, and open to the central opening 38 through the bearing ring 28. The lower end of the recess 14 is closed by an integral end wall 40 of the valve body 12. The bearing ring insert 28 and its seal ring 32 are axially confined between this end wall and a cover plate 42 which seats on the upper end face of the valve body. Cover plate 42 is removably secured to the valve body 12 by bolts 44 which extend through the body bores 16.

Indicated at 46 is a valve rotor including a valve core 48. Valve core 48 is rotatably fitted in the central opening 38 of the bearing ring insert 28. The wall or boundary surface of the ring opening 38 and the confronting surface of the valve core 48 are spherically curved to mate with a close rotatable fit. Preferably, the mating surfaces of the ring and valve core are lapped to provide the core with a precision fit in the ring. The ends of the valve core 48 are machined flat, normal to the axis of the core, and are preferably ground to approximately the same axial dimension as the bearing ring 28 to seat against thrust bearings 50 which are containing in recesses in the inner confronting surfaces of the body end wall 40 and the cover plate 42. Each bearing 50 comprises annular outer races 52, inner races 52', and bearing balls 54 confined between the outer and inner races.

Extending coaxially through the valve core 48 is a shaft 56. Shaft 56 is fixed against turning in the valve core in any convenient way, as by a key 58. The upper end of the shaft 56, as the valve is viewed in the drawings, extends to the exterior of the valve body through a bore in the cover plate 42. The external end of the shaft is squared, as shown, or otherwise constructed to permit the shaft to be turned, thereby to rotate the valve core 48 in the bearing ring insert 28.

Extending laterally through the valve core 48 are passages 60 and 62. In the angular position of the valve rotor 46 shown in FIG. 3, the rotor passage 60 communicates valve body ports 20 and 26 and the rotor passage 62 communicates body passages 22 and 24. It is apparent that the rotor 46 may be turned to communicate the body ports 20 and 22 and the ports 24 and 26 and to block all of the ports. In order to restrain the bearing ring 28 and its seal ring 32 against turning with the rotor, a set screw 64 is threaded in the valve body 12 and extends through the seal ring into the bearing ring.

Slidably fitted in the inner, counterbored end of each bearing ring port 36 is a metallic floating seal 66 having a central passage 68 therethrough. The inner end face of each floating seal 66 is spherically lapped or otherwise machined to seat flush against the spherically curved surface of the valve core 48. The outer end of each floating seal is reduced in diameter to form a cylindrical extension 70. Slidably fitted on the extension 70 of each floating seal is a resilient seal ring 72 of Teflon or other suitable low friction, resilient seal material. In the outer end of each seal ring 72 is a conical recess 74 which receives a conically tapered, metallic wedge or pressure ring 76. Each pressure ring slides on the extension 70 of its respective floating seal 66 and is urged against its respective seal ring 72 by a compression spring 78. Each spring 78 and its pressure ring 76 are thereby effective to urge the respective floating seal 66 axially into contact with the valve core 48 and to urge the respective seal ring 72 axially into contact with the corresponding floating seal 66 as well as to expand the seal ring radially into contact with the wall of the corresponding bearing ring port 36. The seal assemblies including the metallic floating seals 66, seal rings 72, pressure rings 76, and springs 78, serve to prevent fluid leakage between the bearing ring insert 28 and the valve core 48 when the valve rotor 46 is angularly positioned to communicate the valve body ports 20, 22, 24 and 26. When the rotor is turned to misalign the body ports and core passages, the seal assemblies serve to block fluid leakage from one body port to another.

In regard to these sealing functions of the seal assemblies 66, 72, 76, 78, attention is directed to the fact that the seal springs 78 serve primarily to retain the several parts of the assemblies in assembled relation and to exert a resilient centering force on the valve core 48. The seal assemblies are urged inwardly into fluid sealing contact with the valve core and the walls of the bearing ring ports 36, as explained above, by fluid pressure acting on the outer faces of the conical pressure rings 76 and seal rings 72.

Valve body 12 may be provided with any convenient means for mounting the valve on a supporting structure. The illustrated valve, for example, is equipped with a lower apertured mounting flange 80 for this purpose. The flange is integrally joined to the valve body 12 by a short pedestal 82.

The present valve may be constructed of various materials. Preferably, however, the bearing ring insert 28, valve core 48, and the floating metallic seals 66 are composed of a hardened steel, such as S.A.E. 52100 chrome steel having high martensitic characteristics, and are fabricated by the following sequence of steps:

(1) Rough machine the parts to the desired shapes.

(2) Grind the parts to within .002 inch or so of their finish size.

(3) Temper and immediately cold stabilize the ground parts for at least six cycles to insure non-age hardenability and distortion of the parts.

(4) Finish grind and hone the hardened parts to the desired tolerance.

(5) Caseharden the mating surfaces of the valve core, floating seals, and bearing ring insert.

(6) Lap the mating surfaces.

The valve body 12 is preferably machined from 7075T6 aluminum alloy. The body bore 14 may be honed to provide approximately a .002 inch interference fit between the valve body, the bearing ring insert 28 and seal ring 32 so as to require these rings to be pressed into place, thereby to provide an effective fluid tight seal between the valve body and the bearing ring.

The seal rings 72, like the seal ring 32, are preferably composed of a low-friction seal material, such as Teflon. If desired, the radial sealing function of the seal rings 72 can be enhanced by circumferentially grooving the external sealing surfaces of these rings.

It is apparent that the disclosed valve structure is uniquely constructed and arranged to accomplish the objects and advantages preliminarily set forth. Thus, the seal rings 32 and 72, being resilient as they are, and the floating seals 66 being spring loaded as they are accommodate thermal expansion and contraction of the valve without destruction of the fluid tight integrity of the valve or binding of the valve rotor 46. Accordingly, the valve is capable of operation over a wide temperature range without leaking or jamming. The floating, spring loaded seals 66 accommodate wear at the mating sealing surfaces of these seals and the valve core 46 without leakage. Since the floating seals are urged into fluid sealing relation with the valve core by the pressure of the fluid in the valve, the force retaining the floating seals and valve core in sealing relation increases as the fluid pressure increases, whereby the valve is capable of use in a high pressure fluid system without leaking. In this regard, it should be observed that when the rotor 46 is turned to close the valve, the floating seals 66 seat against the valve core 46 to prevent fluid leakage through the valve. Moreover, if two diametrically opposed ports of the valve body 12 are employed as fluid inlets and if the fluid pressure at these opposed ports is equalized, the lateral forces on the valve rotor 46 are substantially balanced regardless of the magnitude of the pressure so that the pressure does not cause any appreciable binding of the rotor. The rotor is thus relatively easy to turn even when the valve is closed.

It is to be noted that there are no sharp bends in the fluid passages through the valve. Accordingly, the valve imposes a minimum pressure drop on fluid flowing through the valve. The valve can obviously be easily assembled.

While a presently preferred embodiment of the invention has been described by way of example, it is not to be inferred therefrom that the invention is limited to the precise details thus disclosed, and it will be understood that the invention includes as well, all such changes and modifications in the parts and in the construction, combination and arrangement of parts as shall come within the purview of the appended claims.

I claim:
1. A valve comprising:
   a body having a centrally disposed, shallow, cylindrical recess and having at least a pair of ports forming openings in the circular wall defining said recess,
   a fluid flow controlling assembly seated in said recess comprising a bearing ring composed of separable, mating ring sections,
   said sections combining to define a spherical valve core seat and said ring having at least a pair of ports affording communication between said body ports and said valve core seat,
   means providing a fluid seal between said bearing ring and said valve body,
   a spherical valve core rotatable in said spherical seat in said ring, and retained against endwise movement by the spherical configuration of said core and said seat,
   said valve core having a fluid passage and being rotatable on said seat between a first position wherein said fluid passage effects communication between said body ports and a second position wherein said core prevents communication between said body ports,
   and other seal means slidingly engaging said valve core spherical surface and affording a fluid seal confining fluid flow between said passage and a port in said bearing ring when in registry therewith.
2. A valve according to claim 1 wherein:
   said first named seal means comprises a resilient seal ring interposed between and contacting the entire areas of the cylindrical faces of said body and said bearing ring,
   said first named seal means having openings therein disposed in registry with said ports,
   and wherein said body carries means simultaneously engaging said bearing ring and said resilient seal ring effective to maintain the openings therein in registry with the ports in said body.
3. A valve according to claim 1 wherein:
   said recess in said body is closed at one of its ends by an integrally formed end wall,
   the other of said end walls being removable for axial insertion of said bearing ring, valve core and seal means into said body recess as a unit, and
   said valve core includes means extending through said removable end wall accessible for moving said core.
4. A valve according to claim 1 wherein:
   said body opening is closed at its ends by end walls on said body,
   one of said end walls is removable for axial insertion of said bearing ring and seal means into said body opening,
   said valve core is mounted for rotation in said seat in said bearing ring,
   ball bearings housed in said end walls are interposed between said valve core and end walls, and said
   means on said valve core is accessible externally of said valve body for moving said core.
5. A valve comprising:
   a body member having a central recess,
   a movable valve core member disposed in said recess,
   means in said recess defining a boundary surface surrounding and confronting the outer surface of said core member,
   said body member having a plurality of ports opening to the exterior of the body member and opening at their inner extremities through said boundary surface to said recess,
   said core member having a passage opening at its extremities through said outer surface of said core member,
   said core member being movable between a first position wherein said core passage communicates with said ports and a second position wherein said core member blocks communicates between said ports
   annular floating seals slidably disposed within the ports of said body member for movement of an end surface of said seal into fluid sealing relation with said surface of the core member,
   slidable means incorporated in said floating seals operative to effect radial expansion thereof into fluid sealing engagement with the walls of their respective ports,
   said floating seals having rear surfaces exposed to fluid pressure in their respective ports, whereby said fluid pressure is effective to urge said floating seals into said fluid sealing relation, and
   said surface of said core member comprises a smooth sealing surface adapted to remain in fluid sealing relation with said floating seals during movement of said valve core.
6. A valve according to claim 5 including:
   springs acting on said floating seals for urging the latter into said fluid sealing relation.
7. A valve according to claim 5 wherein:
   each of said floating seals comprises a resilient seal ring having a rear conical recess, a conical pressure ring seating in said recess, and a spring acting between each pressure ring and said one member for simultaneously urging the respective floating seal into said sealing relation and expanding the respective seal ring radially out against the wall of its respective port.
8. A valve according to claim 5 including:
   a bearing ring within said body recess about said core member,
   said ring being radially split into mating semicircular ring sections and the inner surface of said ring comprising said boundary surface,
   a seal ring interposed between said body and bearing ring,
   said ports extending through said bearing ring and said extremities of said ports being located in said bearing ring,
   said floating seals being disposed in said latter port extremities, and
   said sealing surface comprising the outer surface of said core member.
9. A valve according to claim 8 wherein:
   said core member is rotatable in said recess, and
   said boundary surface and said outer surface of said core member being spherically curved to support said core member for rotation.

References Cited

UNITED STATES PATENTS

| | | | |
|---|---|---|---|
| 1,237,693 | 8/1917 | Prott | 277—117 |
| 3,118,649 | 1/1964 | Allen | 251—309 |
| 3,124,334 | 3/1964 | Szohatzky | 251—367 |
| 3,133,722 | 5/1964 | McGuire | 251—309 |
| 3,166,098 | 1/1965 | Jennings | 137—625.47 |
| 3,252,684 | 5/1966 | Ksieski | 251—309 |

M. CARY NELSON, *Primary Examiner.*

J. W. KNIGHT, W. CLINE, *Assistant Examiners.*